United States Patent
Yoshizawa et al.

[11] Patent Number: 6,007,899
[45] Date of Patent: Dec. 28, 1999

[54] SHEET-AFFIXED WINDOW GLASS FOR A VEHICLE

[75] Inventors: Hideo Yoshizawa; Yasuo Yamamoto, both of Osaka, Japan

[73] Assignee: Nippon Sheet Glass Co., Ltd., Osaka, Japan

[21] Appl. No.: 09/095,136

[22] Filed: Jun. 10, 1998

[30] Foreign Application Priority Data

Jun. 12, 1997 [JP] Japan .................................. 9-155530

[51] Int. Cl.⁶ .................................................. B32B 23/02
[52] U.S. Cl. ......................... 428/192; 428/77; 428/100; 428/203; 428/207; 428/358; 428/365; 428/411.1; 428/417; 428/425.6; 428/426; 428/437; 296/95.1; 296/97.1; 296/97.7; 296/97.8; 296/146.1; 296/152; 296/211; 160/105; 160/354; 160/268.1; 160/370.21; 150/168; 40/591
[58] Field of Search ................................... 428/411.1, 77, 428/100, 168, 174, 203, 417, 358, 365, 437, 425.6, 192, 165, 207; 296/97.7, 95.1, 97.9, 97.1, 97.8, 146.1, 211, 218, 152, 214; 40/591, 593; 150/168; 160/105, 354, 370.21, 368.1

[56] References Cited

U.S. PATENT DOCUMENTS

| | | | |
|---|---|---|---|
| 4,398,586 | 8/1983 | Hall | 160/105 |
| 4,790,591 | 12/1988 | Miller | 160/370.2 |
| 4,827,646 | 5/1989 | Miller et al. | 40/541 |
| 5,014,758 | 5/1991 | Stinson | 150/168 |
| 5,033,786 | 7/1991 | Bickford | 296/97.9 |
| 5,038,844 | 8/1991 | Edmonds et al. | 160/370.2 |
| 5,064,239 | 11/1991 | Folcik | 296/97.1 |
| 5,390,975 | 2/1995 | Stephens | 296/211 |
| 5,799,449 | 9/1998 | Lyons et al. | 52/204.51 |

*Primary Examiner*—Deborah Jones
*Assistant Examiner*—Abraham Bahta
*Attorney, Agent, or Firm*—Whitham, Curtis & Whitham

[57] ABSTRACT

A transparent or opaque sheet is affixed onto the inner surface of a side door window glass of a vehicle for coloration, light blockage, decoration and the like. In the sheet-affixed window glass, the sheet is directly but detachably affixed onto the inner surface of the window glass via a front holder and a back holder.

18 Claims, 13 Drawing Sheets

SHEET-AFFIXED WINDOW GLASS FOR A VEHICLE

BACKGROUND OF THE INVENTION

1. Field of the Invention

The present invention relates to a sheet-affixed window glass for a vehicle.

2. Description of the Related Art

Transparent or opaque window glass for vehicles is known, which is for coloration, light blockage, decoration and the like. This includes, for example, laminated glass in which its interlayer is colored, and reinforced glass which is coated with a film formed thereon by vapor deposition.

However, the known window glass for vehicles is problematic in that, after it has been once fitted into car windows, users could not change the characteristics of the thus-fitted window panes, including the color, light-blocking ability and decorativeness thereof, unless they exchange the once-fitted window panes for new ones.

Apart from the known window glass of that type, also known are car window panes of a different type to which is affixed a transparent or opaque film for coloration, light blockage, decoration and the like. However, these are also problematic in that, when the film is affixed onto the inner surfaces of car window panes, air bubbles often remain between the glass and the film or the film is often waved, and the operation of affixing the film onto car window panes requires good skill.

In addition, when the films are desired to be peeled from the film-affixed car window panes for the purpose of changing their color, light-blocking ability and decorativeness, it is difficult to peel the films from the window panes. Further, the once-peeled films could not be re-used as being deformed or broken.

For these reasons, it is not easy to change the color, the light-blocking ability and the decorativeness of the film-affixed car window panes.

SUMMARY OF THE INVENTION

Given that situation, the object of the invention is to provide a technique of detachable window glass sheets capable of being easily attached to and detached from window glass and even from window panes thereby satisfying the demand for changing with ease the color, the light-blocking ability and the decorativeness of car window panes.

In order to solve the problems, the present invention provides sheet-affixed window glass for vehicles, which comprises a transparent or opaque sheet for coloration, light blockage, decoration and the like, and a holder directly attached to the inner surface of window glass in order to hold the sheet along the inner surface of the window glass.

In the sheet-affixed window glass of the invention, the transparent or opaque sheet for coloration, light blockage, decoration and the like is attached to the inner surface of window glass via the holder, in which, therefore, the sheet can be easily attached to or detached from the window glass. Accordingly, the once-affixed sheet can be easily exchanged for a new one. Users can easily exchange the once-affixed sheet for a new one to thereby change the color, the light-blocking ability and the decorativeness of car window panes.

The window glass may be provided with a film at a site at which the holder is fitted to the window glass.

The film as provided at the site at which the holder is fitted to the window glass masks the holder. In this, therefore, the holder is kept from being seen through the outer surface of the window glass, and, in addition, the adhesive used for fitting the holder to the window glass is protected from being aged.

Further, the sheet can be tightly attached onto the window glass via the holder.

In this, since the sheet is tightly attached onto the inner surface of the window glass, the sheet-affixed window glass looks as if the glass itself were colored or decorated or were processed to have the light-blocking ability.

Still further, in the present invention, the transparent or opaque sheet for coloration, light blockage, decoration and the like is provided with hooking grooves partly at its periphery, and hooks for those hooking grooves are directly fitted to the inner surface of the window glass via which the sheet is held to be airtightly adhered onto the inner surface of the window glass.

In this embodiment, the sheet is held on the window glass along its inner surface by hooking the hooking grooves at the hooks directly fitted to the inner surface of the window glass. In this, therefore, the holder mechanism for the sheet is simple.

DETAILED DESCRIPTION OF THE PREFERRED EMBODIMENTS

Preferred modes of carrying out the invention are described hereinunder with reference to the drawings attached hereto. The drawings shall be seen just as indicated by the reference numerals.

Figure 1:
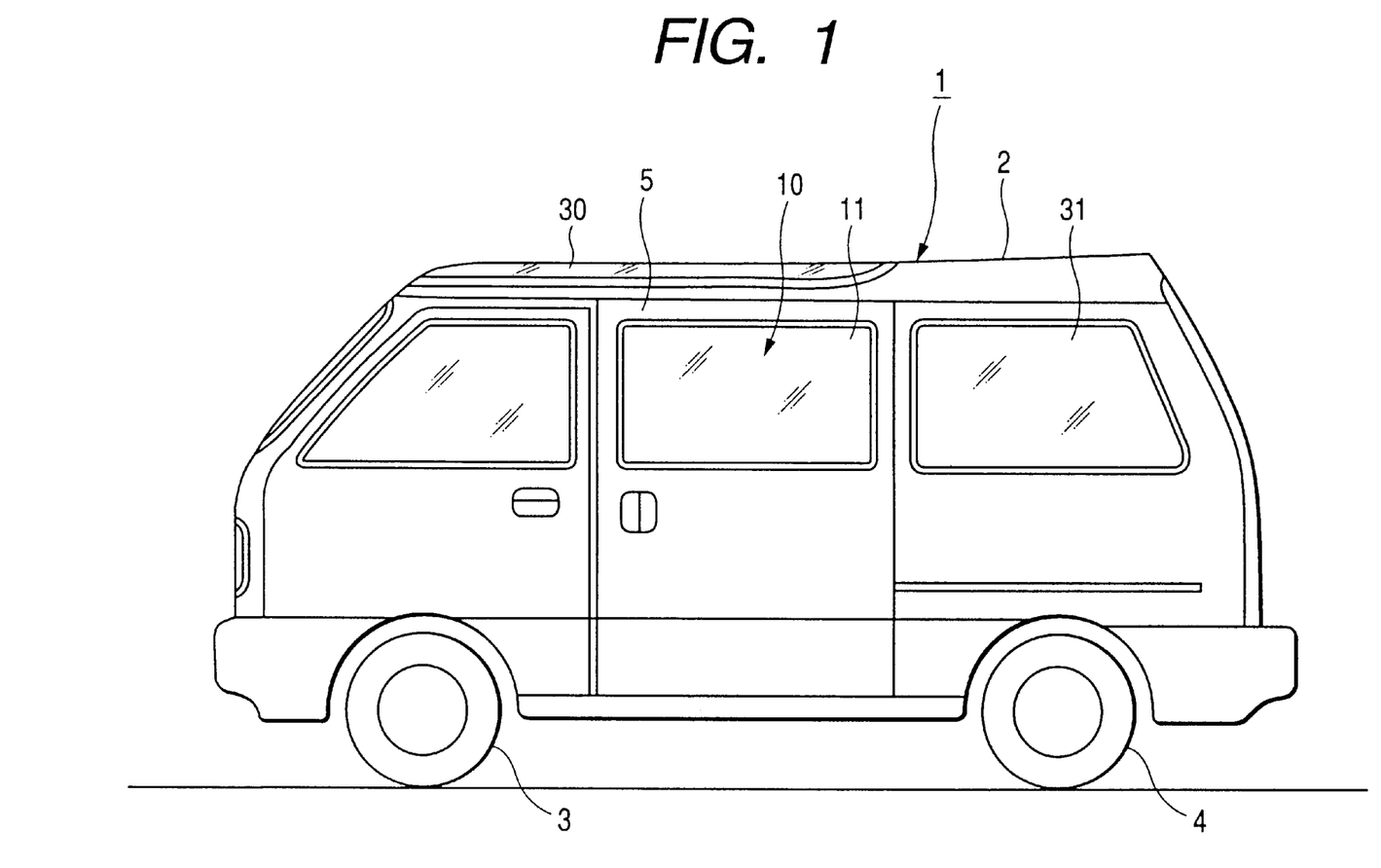
FIG. 1 is a side view of a van in which a sheet-affixed window glass according to a first embodiment of the invention is used.

FIG. 1 is a side view of a van in which is used sheet-affixed window glass in accordance with a first embodiment of the invention. In FIG. 1, the van 1 has the front wheels 3, 3 and the rear wheels 4, 4 (one of those not seen are not shown) provided at the front and the back of the body 2, the side door 5 attached at the center of the body 2, and the window 10 fixed into the side door 5, in which the window 10 is fitted with a sheet-affixed window glass of the invention. In FIG. 1, 30 designates a roof window, and 31 is a quarter window.

Figure 2:
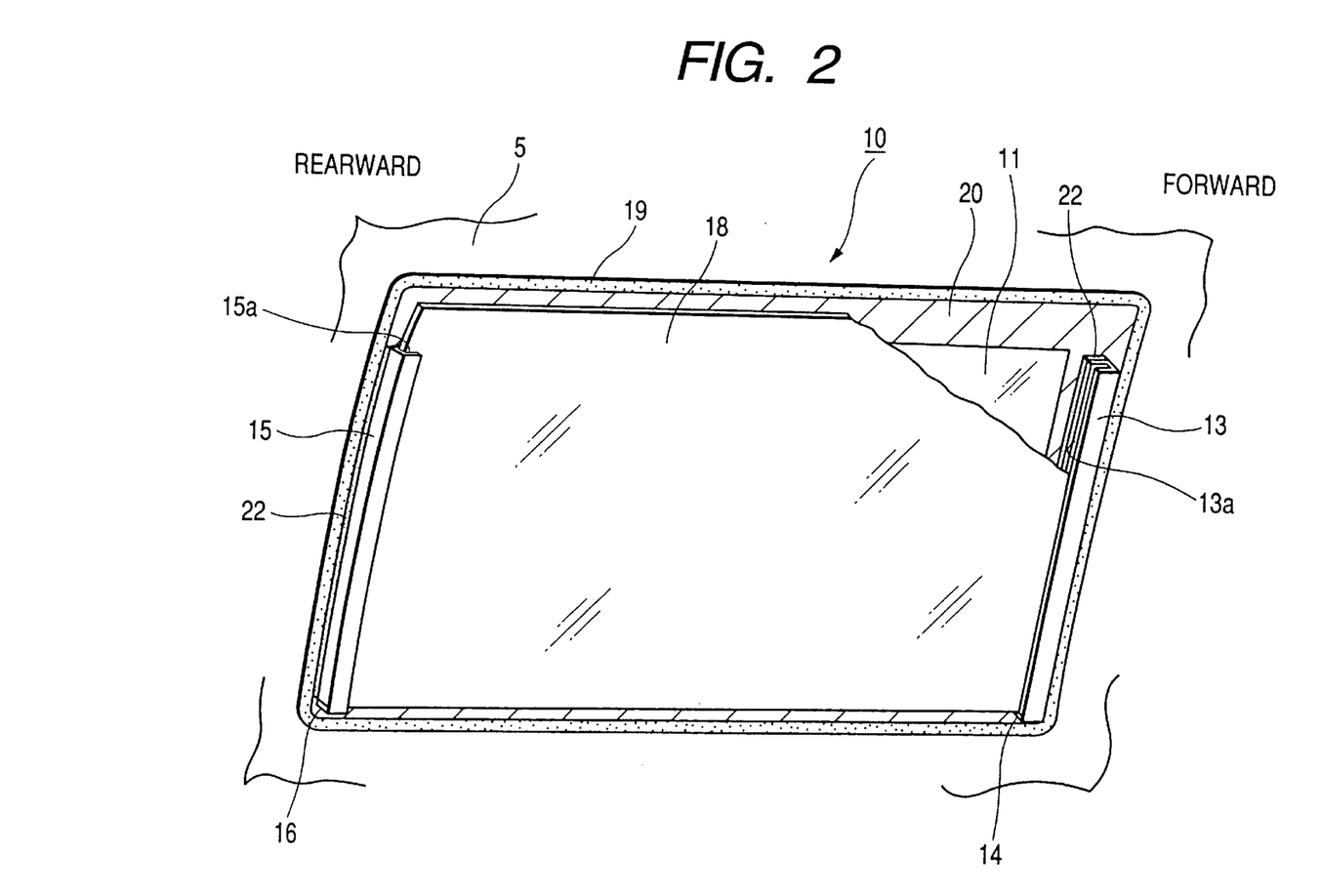
FIG. 2 is a perspective view of the sheet-affixed window glass according to the first embodiment.

FIG. 2 is a perspective view of the sheet-affixed window glass 10 of the first embodiment, which is seen from the room side of the van 1.

The sheet-affixed window glass 10 comprises side door window glass 11, a front holder 13 directly fitted to the inner surface of the front edge of the window glass 11, a back holder directly fitted to the inner surface of the back edge of the window glass 11, a front groove 13a and a back groove 15a being provided in the front and back holders 13 and 15, respectively, and a flexible sheet 18 fitted into those front groove 13a and back groove 15a. In FIG. 2, 19 designates a mole via which the side door window glass 11 is fitted to the side door 5.

The front and back holders 13 and 15 are frames into which the sheet 18 is slid and fixed at its front and back edges.

Figure 3:
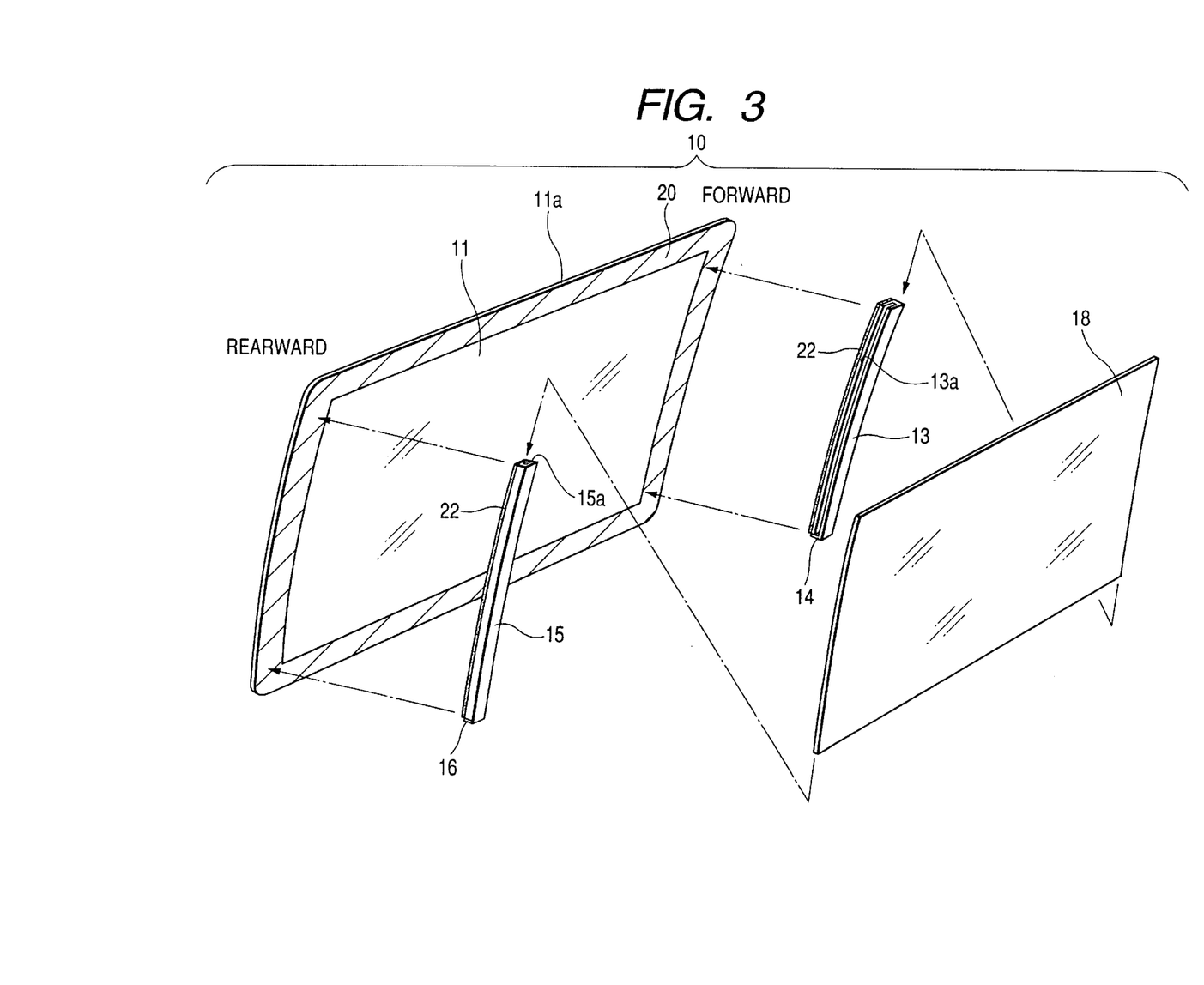
FIG. 3 is an exploded perspective view of the sheet-affixed window glass according to the first embodiment.

FIG. 3 is an exploded perspective view of the sheet-affixed window glass of the aforementioned first embodiment of the invention.

The side door window glass 11 is curved, of which the inner surface is coated with a film 20 along its edge 11a, specifically partly at the site at which the holders 13 and 15 are fitted to the glass 11. The film 20 is formed on the glass 11 by baking at a high temperature a glass frit-containing inorganic pigment material as applied onto the intended area of the glass 11 through screen printing, or is a cured film of an organic material containing pigment or dye, and its surface is roughened more than the surface of the window glass 11.

The film 20 is provided in order to prevent the front and back holders 13 and 15 from being seen through the outer surface of the window glass 10 by anyone existing outside the van 1 shown in FIG. 1, and in order to protect adhesives 22, 22, which will be mentioned hereinunder, from being aged.

With its cross section being U-shaped, the front holder 13 is provided with a front groove 13a to receive the front edge of the sheet 18 and a stopper 14 to close the lower edge of the front groove 13a. Like the front holder 13, the back holder 15 is provided with a back groove 15a to receive the back edge of the sheet 18 and a stopper 16 to close the lower edge of the back groove 15a, also with its cross section being U-shaped.

The front groove 13a and the back groove 15a are so planned that their width is slightly larger than the thickness of the sheet 18.

The front and back holders 13 and 15 are curved in accordance with the side-view curve of the window glass 11.

The front and back holders 13 and 15 are directly attached onto the film 20 as formed on the inner surface of the window glass 11, via curable adhesives 22, 22 (these may be adhesive-double coated tapes). The surface of the film 20 formed on the inner surface of the window glass 11 can be more roughened than that of the window glass 11 itself, the adhesiveness of the adhesive 22 can be enhanced to thereby ensure the tight adhesion of the front and back holders 13 and 15 onto the window glass 11.

The sheet 18 is, for example, a flexible rectangular sheet of synthetic resin. This is slid and fixed into the front groove 13a and the back groove 15a of the front and back holders 13 and 15, respectively, and is tightly fitted to the inner surface of the window glass 11 via the holders 13 and 15.

The sheet 18 is a light-attenuating or light-shielding sheet for controlling color, light and heat, or is a sound-shielding sheet for controlling sound.

The functions of the sheet-affixed window glass according to the first embodiment are mentioned below.

Figure 4A:
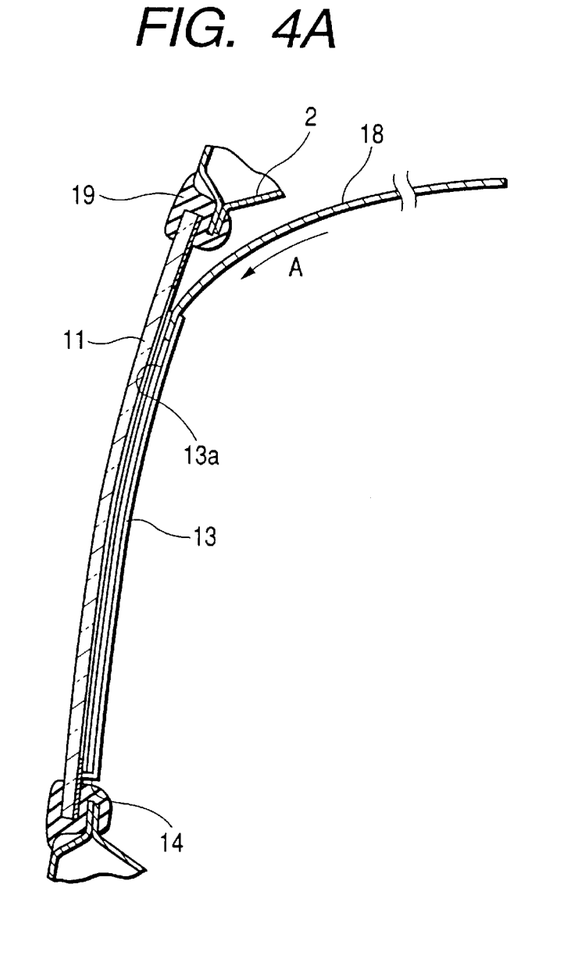
FIG. 4 is an explanatory view illustrating the mechanism of the sheet-affixed window glass according to the first embodiment.
Figure 4B:
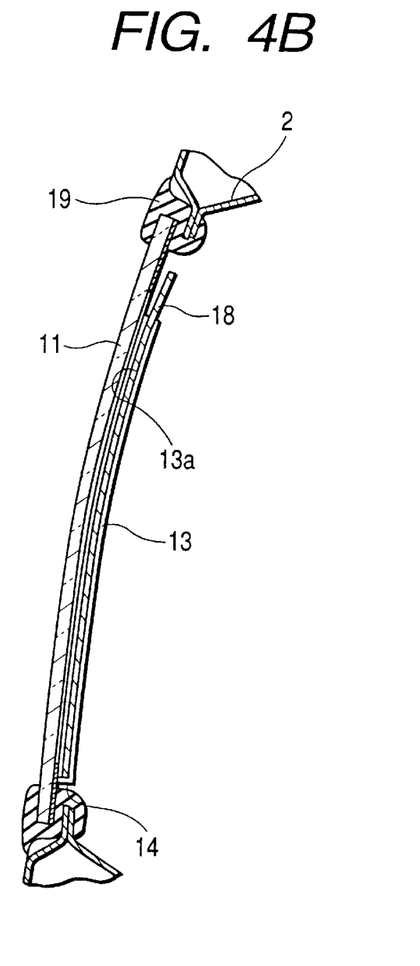

FIGS. 4A and 4B are explanatory views to illustrate the sheet-affixed window glass of the aforementioned first embodiment. Since the holders 13 and 15 are line-symmetric to each other, only the holder 13 is described hereinunder while omitting the description of the holder 15.

As shown in FIG. 4A, the sheet 18 is slid and fitted into the front groove 13a of the front holder 13 from its upper edge in the direction of an arrow A. Since the sheet 18 is flexible, it can be elastically deformed and curved without being interfered with by the ceiling of the van 1.

FIG. 4B shows the finished condition of the sheet 18 as entirely fitted into the front groove 13a of the front holder 13. The lower edge of the sheet 18 is fixed while being in contact with the stopper 14 provided at the lower edge of the front holder 13. The sheet 18 is elastically deformed and curved along the shape of the front holder 13. Accordingly, the sheet 18 is tightly fitted into the front holder 13 without being movable.

Since the sheet 18 is detachable, it can be exchanged for another one for intentionally changing the color and also the light-, heat- and sound-shieldability of the window glass 11 to which it is affixed. If the once-affixed sheet 18 is broken, it can be exchanged for a fresh one with ease.

In addition, since the once-affixed sheet 18 can be easily detached from the holders without being bent or broken, the thus-detached sheet 18 can be re-used.

In addition, the front holder 13, if attached to the side door window glass 11 of the van 1 (see FIG. 1), the window glass 11 is made shieldable against light.

Now described hereinunder is a second embodiment of the invention.

Figure 5:
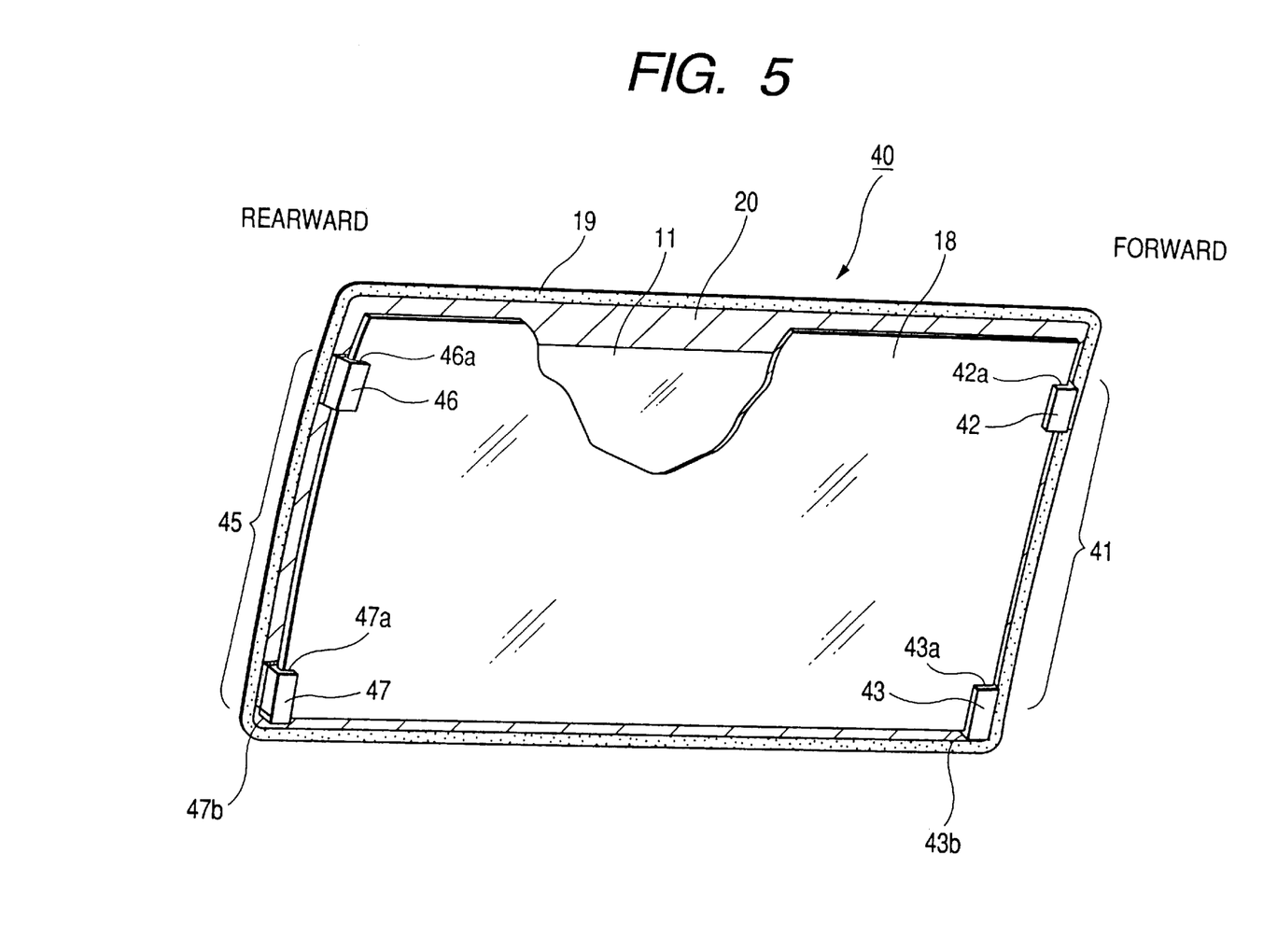
FIG. 5 is a cross-sectional view of the sheet-affixed window glass according to a second embodiment of the invention.

FIG. 5 is a cross-sectional view of the sheet-affixed window glass according to the second embodiment of the invention. In this embodiment, the same members as those in the first embodiment are referred to by the same reference numerals and their description is omitted.

As shown in FIG. 5, the sheet-affixed window glass 40 comprises an upper front holder 42 and a lower front holder 43 for the front holder 41, and an upper back holder 46 and a lower back holder 47 for the back holder 45.

Like the front holder 13 in the first embodiment (see FIG. 2), the upper front holder 42 of the front holder 41 has a U-shaped cross section, and is provided with an upper front groove 42a into which the upper front edge of the sheet 18 is fixed. Like the upper front holder 42, the lower front holder 43 of the front holder 41 has a U-shaped cross section and is provided with a lower front groove 43a into which the lower front edge of the sheet 18 is fixed, and is further provided with a stopper 43b to close the lower front groove 43.

The upper back holder 46 and the lower back holder 47 of the back holder 45 are provided with an upper back groove 46a and a lower back groove 47a, respectively, into which the back edge of the sheet 18 is fixed, like the back holder 15 in the first embodiment (see FIG. 2). The lower back holder 47 is provided with a stopper 47b at its lower edge, by which the lower back groove 47a is closed.

Like the sheet-affixed window glass 10 in the first embodiment (see FIG. 2), the sheet-affixed window glass 40 is advantageous in that the sheet 18 can be easily attached to and detached from the window glass 11.

A third embodiment of the invention is described hereinunder.

Figure 6:
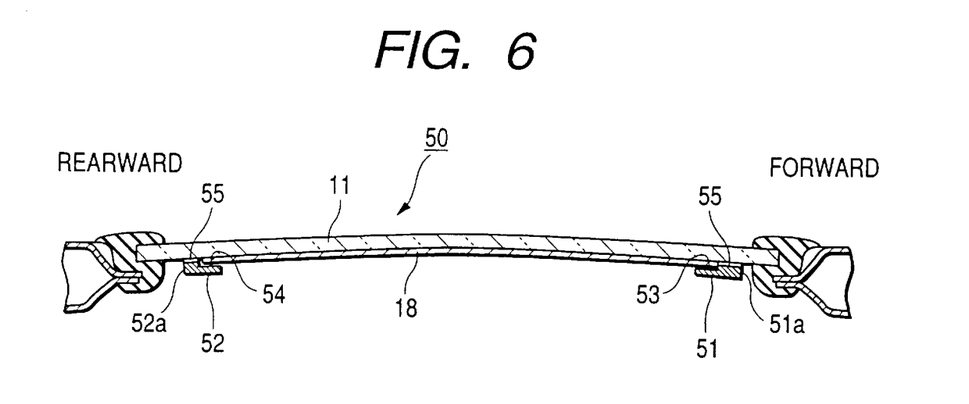
FIG. 6 is a cross-sectional view of the sheet-affixed window glass according to a third embodiment.

FIG. 6 is a cross-sectional view of the sheet-affixed window glass according to the third embodiment of the invention. In this embodiment, the same members as those in the first embodiment are referred to by the same reference numerals and their description is omitted.

As in FIG. 6, the sheet-affixed window glass 50 comprises an L-shaped front holder 51 attached to the inner surface of the front edge of the window glass 11, and an L-shaped back holder 52 attached to the inner surface of the back edge of the window glass 11, via which the sheet 18 is airtightly affixed onto the inner surface of the window glass 11.

The front and back holders 51 and 52 are nearly L-shaped, of which the width of the legs 51a and 52a (in the lengthwise direction of the van 1) is enlarged in order to ensure the satisfactory adhesion of the holders to the window glass 11. In FIG. 6, 55, 55 are adhesives.

The front and back holders 51 and 52 are arranged to give a frame around the front and back edges of the sheet 18.

In the sheet-affixed window glass 50, the sheet 18 is fitted into the front groove 53 and the back groove 54 as formed by the front and back holders 51, 52 and the window glass 11, whereby the sheet 18 is tightly attached onto the inner surface of the window glass 11.

Accordingly, the sheet-affixed window glass 50 looks as if the window glass 11 itself were colored or decorated or were processed to have the light-blocking ability, when seen outside.

Next is a fourth embodiment of the invention.

Figure 7:
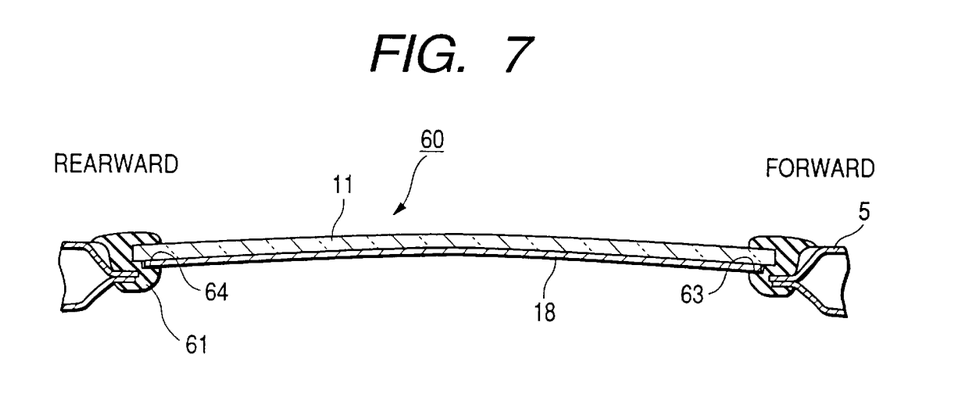
FIG. 7 is a cross-sectional view of the sheet-affixed window glass according to a fourth embodiment of the invention.

FIG. 7 is a cross-sectional view of the sheet-affixed window glass according to the fourth embodiment of the invention, in which the same members as those in Example 1 are referred to by the same reference numerals and their description is omitted.

As in FIG. 7, the sheet-affixed window glass 60 is characterized in that the mole 61 via which the window glass 11 is fitted into the side door 5 is provided with a front groove 63 and a back groove 64 into which the sheet 18 is fixed.

The sheet-affixed window glass 60 does not require any additional holder at the front and the back of the inner surface of the window glass 11, and can therefore have a large space for the window glass 11. In this, in addition, the sheet 18 can be directly attached to the inner surface of the window glass 11 with tight contact therebetween.

Accordingly, the sheet-affixed window glass 60 looks as if the window glass 11 itself were colored or decorated or were processed to have the light-blocking ability, when seen outside.

Next is a fifth embodiment of the invention.

Figure 8:
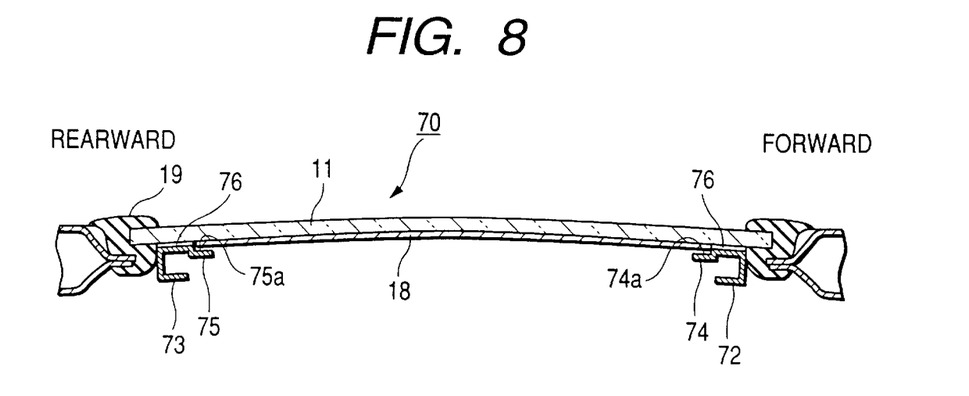
FIG. 8 is a cross-sectional view of the sheet-affixed window glass according to a fifth embodiment of the invention.

FIG. 8 is a cross-sectional view of the sheet-affixed window glass according to the fifth embodiment of the invention, in which the same members as those in the first embodiment are referred to by the same reference numerals and their description is omitted.

As shown in FIG. 8, the sheet-affixed window glass 70 is provided with a front holder 74 as integrated with a front curtain rail 72 along which a curtain (not shown) is slid, and a back holder 75 as integrated with a back curtain rail 73 along which the curtain (not shown) is slid. In FIG. 8, 76, 76 are adhesives.

In the sheet-affixed window glass 70, the sheet 18 is fitted into the front groove 74a and the back groove 75a formed by the front and back holders 74. 75 and the window glass 11, whereby the sheet 18 is tightly attached onto the inner surface of the window glass 11.

Accordingly, the sheet-affixed window glass 70 looks as if the window glass 11 itself were colored or decorated or were processed to have the light-blocking ability, when seen outside.

Next is a sixth embodiment of the invention.

Figure 9:
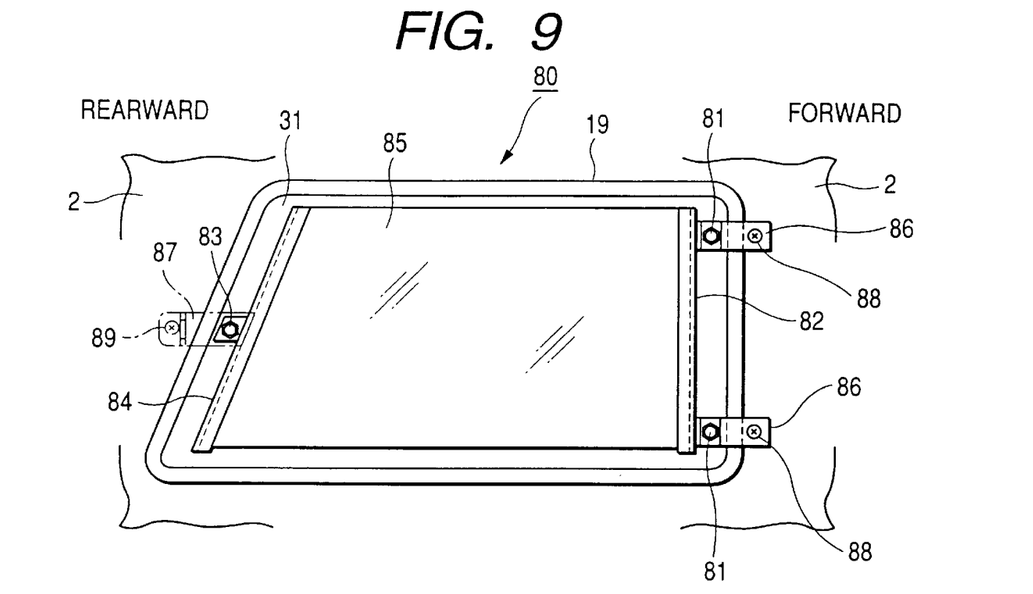
FIG. 9 is a side view of the sheet-affixed window glass according to a sixth embodiment of the invention.

FIG. 9 is a side view of the sheet-affixed window glass according to the sixth embodiment of the invention, which is fitted into the quarter window 31 of the van 1 of FIG. 1 and which is seen in the room of the van 1. In FIG. 9, the same members as those in the first embodiment are referred to by the same reference numerals and their description is omitted.

As shown in FIG. 9, the sheet-affixed window glass 80 of the quarter window 31 is characterized in that the front holder 82 is attached to the inner surface of the window glass 31 via the hinge bolts 81, 81, while the back holder 84 is attached to the inner surface of the window glass 31 via the lock bolt 83, and the sheet 85 is fitted into the front holder 82 and the back holder 84.

The front and back holders 82, 84 are arranged to give a frame around the front and back edges of the sheet 85.

The hinge bolts 81, 81 are to fix the spring strips 86, 86 for hinges onto the window glass 31 at their back edges, while the lock bolt 83 is to fix the lock member 87 onto the window glass 31.

In FIG. 9, 88, 88 designate hinge bolts by which the spring strips 86, 86 are fixed onto the car body 2; and 89 is a lock bolt by which the lock member 87 is fixed onto the car body 2.

The functions of the sheet-affixed window glass according to the sixth embodiment are described below.

Figure 10A:
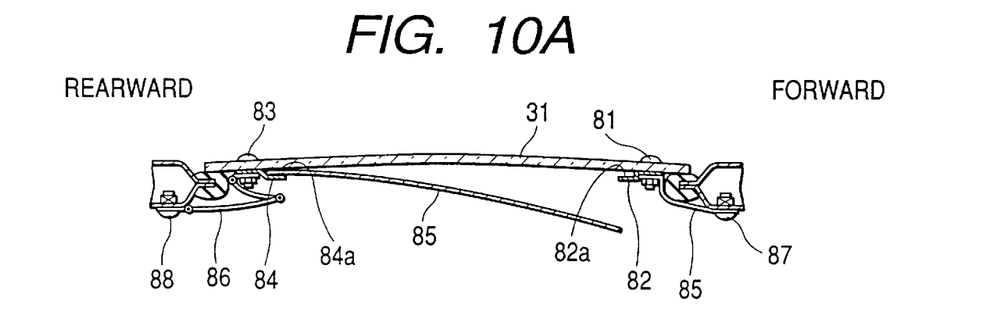
FIG. 10 is an explanatory view illustrating the mechanism of the sheet-affixed window glass according to the sixth embodiment.
Figure 10B:
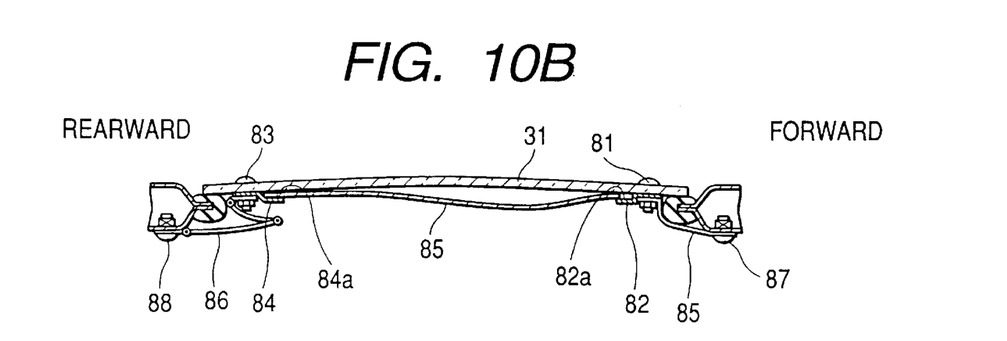

FIGS. 10A and 10B are explanatory views to illustrate the sheet-affixed window glass according to the sixth embodiment of the invention.

As shown in FIG. 10A, the back edge of the sheet 85 is fitted into the back groove 84a of the back holder 84. In this, the sheet 85 is elastically deformed and curved inside.

As in FIG. 10B, the front edge of the sheet 85 is fitted into the front groove 82a of the front holder 82. In that condition, the sheet 85 is tightly attached to the inner surface of the window glass 31 with its back edge and front edge being fitted into the back groove 84a and the front groove 82a, respectively.

Accordingly, the sheet-affixed window glass 80 looks as if the window glass 31 itself were colored or decorated or were processed to have the light-blocking ability, when seen outside.

Next is a seventh embodiment of the invention.

Figure 11:
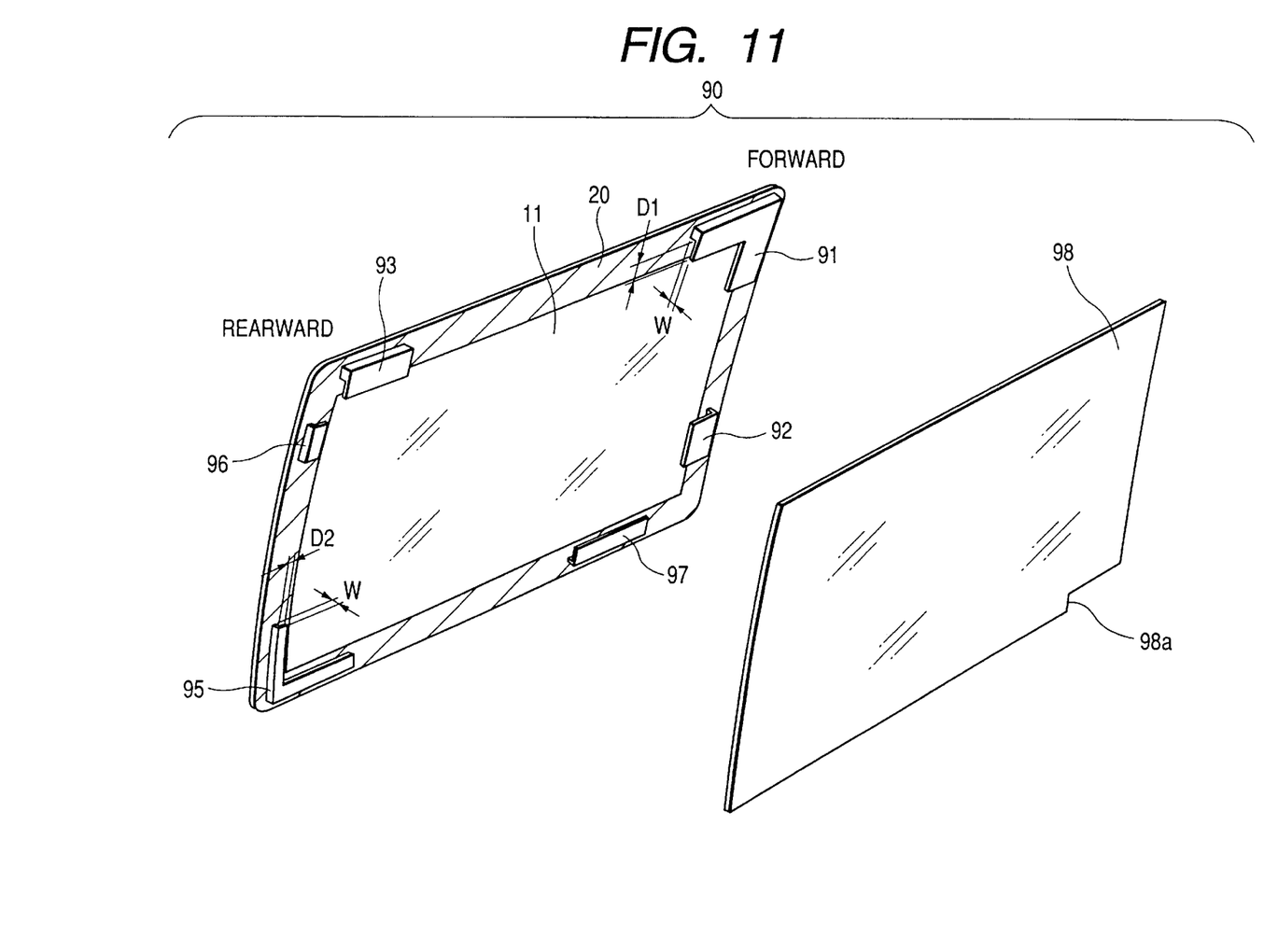
FIG. 11 is a perspective view of the sheet-affixed window glass according to a seventh embodiment of the invention.

FIG. 11 is a perspective view of the sheet-affixed window glass 90 according to the seventh embodiment of the invention, which is seen from the room side of the van 1. In FIG. 11, the same members as those in the first embodiment are referred to by the same reference numerals and their description is omitted.

As shown in FIG. 11, the sheet-affixed window glass 90 is provided with a wide corner holder 91, a wide front holder 92 and a wide upper back holder 93 at the front corner and the both edges of the window glass 11, and with a narrow back corner holder 95, a narrow back holder 96 and a narrow lower front holder 97 at the back corner and the both edges of the window glass 11.

These holders give grooves along with the window glass 11 onto which the holders attached, and the width W, of each groove is planned to be slightly larger than the thickness of the sheet 98. The depth D1, of the groove of each of the front corner holder 91, the front holder 92 and the upper back holder 93 is planned to be larger than the depth D2, of the groove of each of the back corner holder 95, the back holder 96 and the lower front holder 97.

The lower front holder 97 is provided with a step 97a (this is illustrated in FIG. 12) at which the step 98a of the sheet 98 is hooked to the holder 97.

The functions of the sheet-affixed window glass according to the seventh embodiment are mentioned below.

Figure 12A:
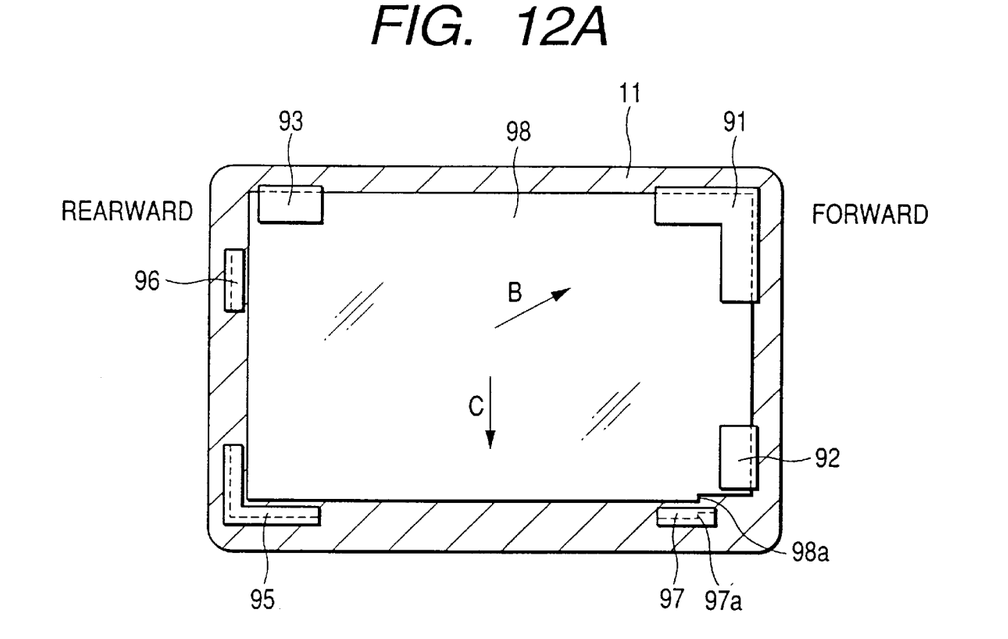
FIG. 12 is an explanatory view illustrating the mechanism of the sheet-affixed window glass according to the seventh embodiment.
Figure 12B:
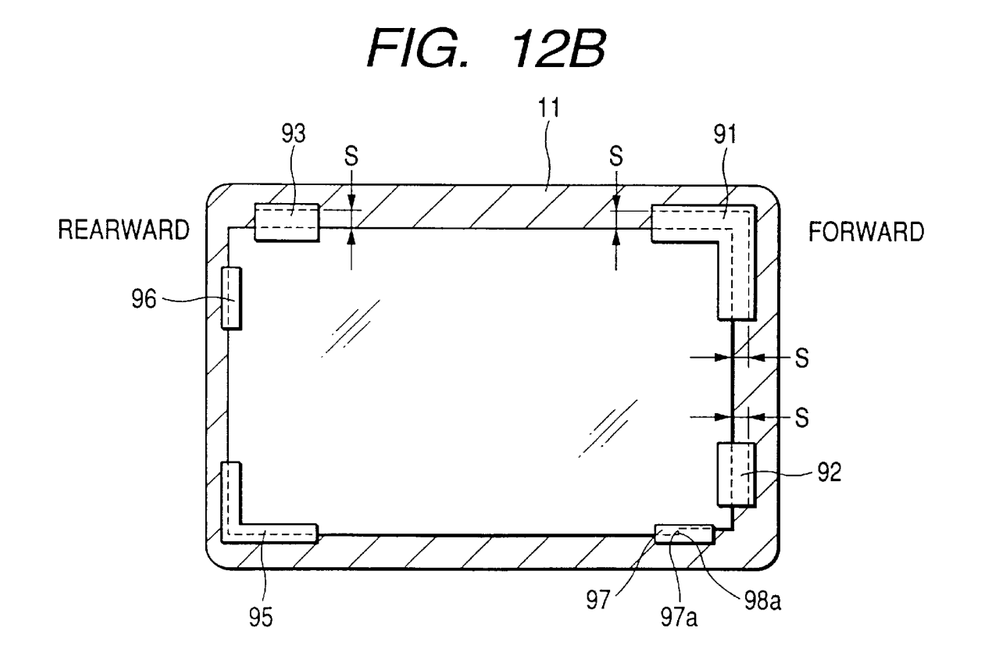

FIG. 12A and 12B are explanatory views to illustrate the sheet-affixed window glass of the seventh embodiment.

As shown in FIG. 12A, the sheet 98 is attached to the window glass 11 while being slid and fitted into the front corner holder 91, the front holder 92 and the upper back holder 93 in the direction of the arrow B.

In that condition, the sheet 98 is positioned inside the back corner holder 95, the back holder 96 and the lower front holder 97, resulting in that the sheet 98 is in tight contact with the window glass 11.

Next, the sheet 98 is slid downward in the direction of the arrow C, while still being in tight contact with the window glass 11.

Then, as shown in FIG. 12B, the sheet 98 is inserted into the back corner holder 95, the back holder 96 and the lower front holder 97, while the step 98a of the sheet 98 is hooked on the step 97a of the lower front holder 97, resulting in that the sheet 98 is prevented from being moved in the horizontal direction. The sheet 98 is not moved in the vertical direction because of its own weight.

In that condition, there is a space S, between the sheet 98 and the front corner holder 91, the front holder 92 and the upper back holder 93, but the sheet 98 is still kept to be inserted into the front corner holder 91, the front holder 92 and the upper back holder 93.

Accordingly, since the sheet 98 is kept in airtight contact with the window glass 11, the sheet-affixed window glass 90 looks as if the window glass 11 itself were colored or decorated or were processed to have the light-blocking ability, when seen outside.

Next is an eighth embodiment of the invention.

Figure 13:
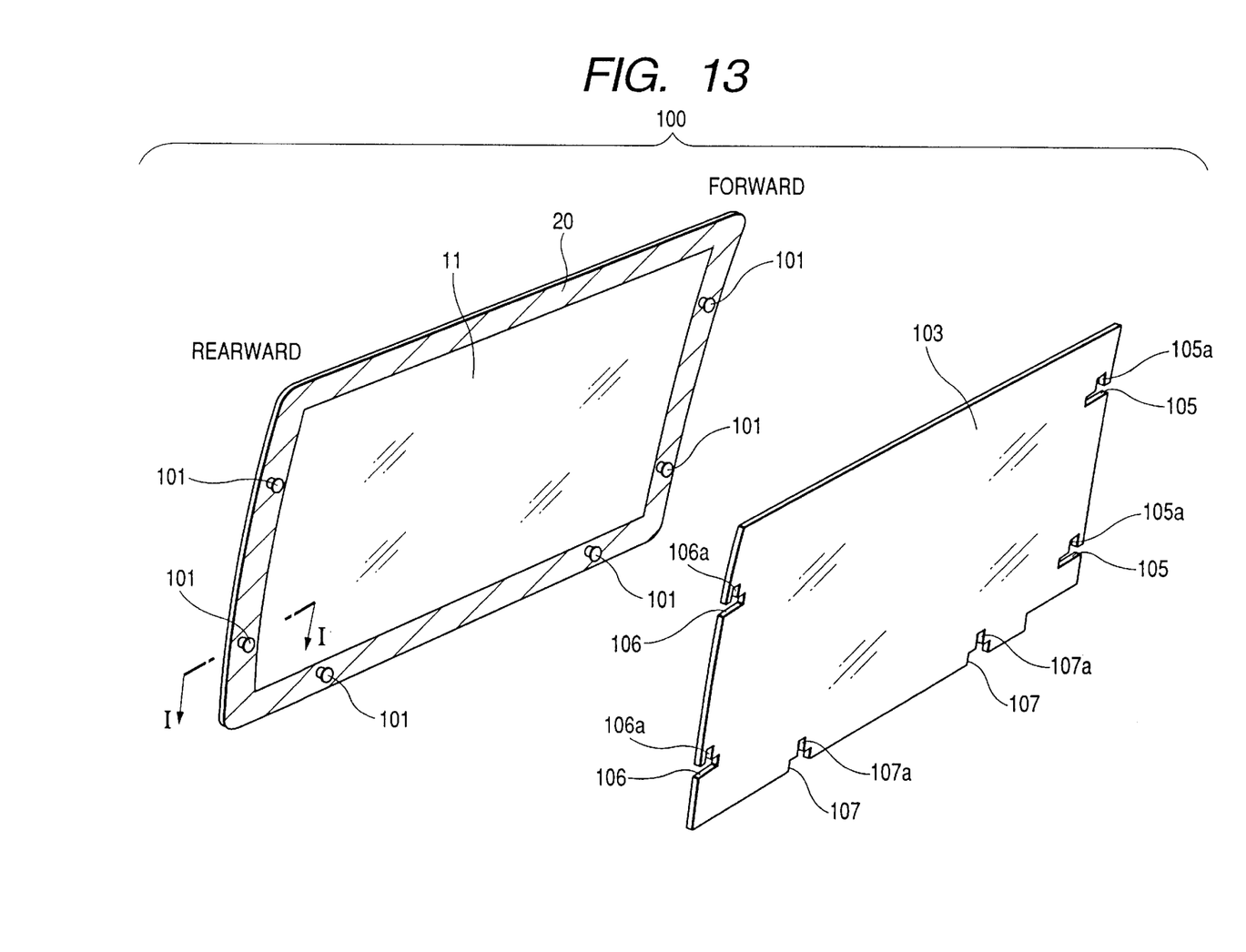
FIG. 13 is a perspective view of the sheet-affixed window glass according to an eighth embodiment of the invention.

FIG. 13 is a perspective view of the sheet-affixed window glass 100 according to the eighth embodiment of the invention, which is seen from the room side of the van 1. In FIG. 13, the same members as those in the first embodiment are referred to by the same reference numerals and their description is omitted.

As shown in FIG. 13, the sheet-affixed window glass 100 is characterized in that the glass window 11 is provided with hooks 101, . . . at the front and back sides and the lower side, and that the sheet 103 is provided with the front hooking grooves 105, 105, the back hooking grooves 106, 106 and lower hooking grooves 107, 107 around its periphery, into which the hooks 101, . . . are hooked.

Figure 14A:
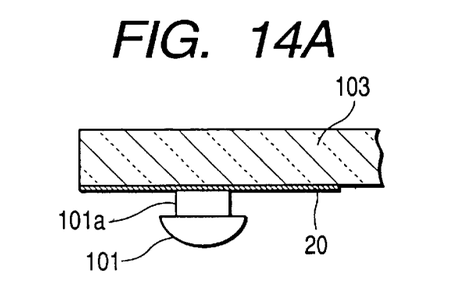
FIG. 14 is a cross-sectional view illustrating the attachment of hooks for use in the eighth embodiment of the invention.
Figure 14B:
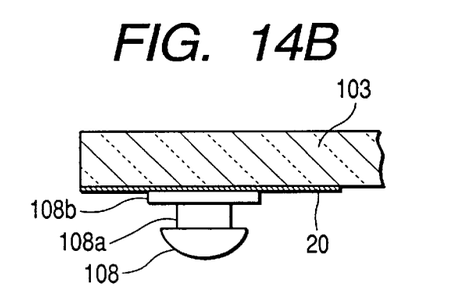

FIGS. 14A and 14B are cross-sectional views illustrating the attachment of the sheet 103 to the film 20 of the window glass 11 via the hooks. Precisely, FIG. 14A is a cross-sectional view of FIG. 13 taken along the line I—I. FIG. 14B is a cross-sectional view illustrating a modification of the embodiment of FIG. 14A.

As shown in FIG. 14A, the column 101a of the hook 101 is in direct contact with the surface of the film 20 formed on the window glass 11.

In the modification in FIG. 14B, the base edge of the column 108a of the hook 108 is integrated with an adhesive member 108b, and the hook 108 is affixed to the surface of the film 20 of the window glass 11 via this adhesive member 108b. In this modification, the hook 108 is more surely affixed to the window glass 11.

The functions of the sheet-affixed window glass according to the eighth embodiment of the invention are mentioned below.

Figure 15A:
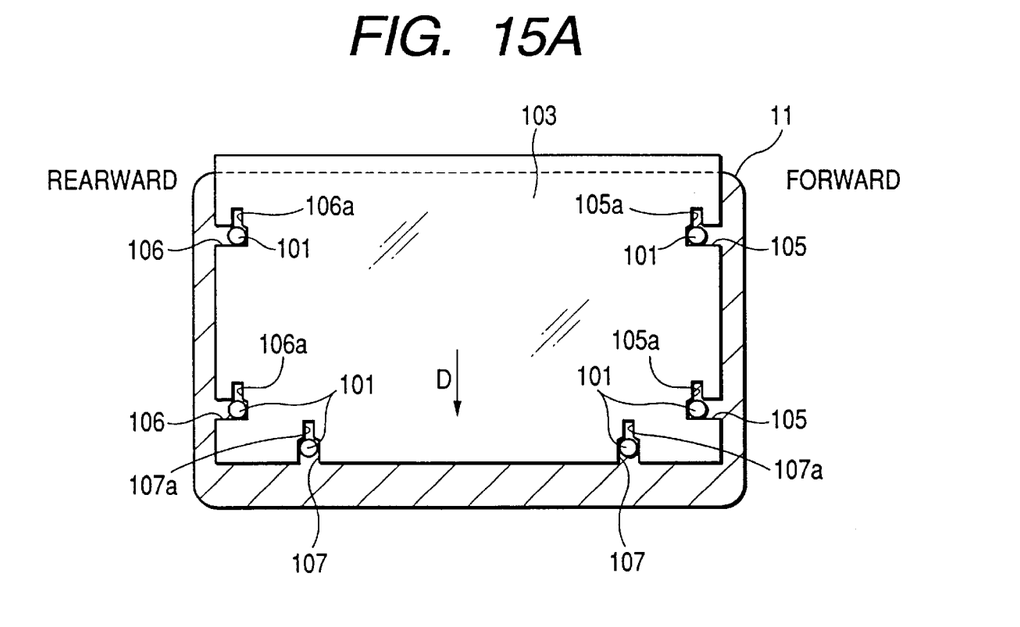
FIG. 15 is an explanatory view illustrating the mechanism of the sheet-affixed window glass according to the eighth embodiment.
Figure 15B:
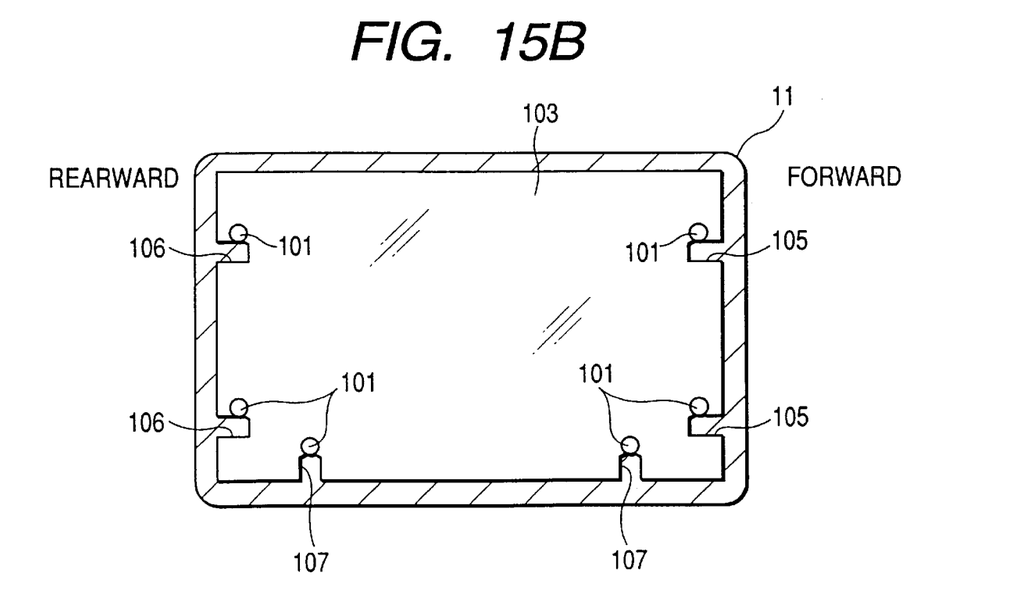

FIGS. 15A and 15B are explanatory views to illustrate the sheet-affixed window glass according to an eighth embodiment of the invention.

As shown in FIG. 15A, the hooks 101, . . . are fitted into the front hooking grooves 105, 105, the back hooking grooves 106, 106 and the lower hooking grooves 107, 107 of the sheet 103 to thereby press the sheet 103 against the window glass 11.

Next, the sheet 103 is slid downward in the direction of the arrow D, while being in airtight contact with the window glass 11.

Then, as shown in FIG. 15B, the hooks 101, 101 are locked up into the locking parts 105a, 105a of the front hooking grooves 105, 105 (see FIG. 15A), while the hooks 101, 101 are into the locking parts 106a, 106a of the back hooking grooves 106, 106 (see FIG. 15A). Further, the hooks 101, 101 are locked up into the locking parts 107a, 107a of the lower hooking grooves 107, 107 (see FIG. 15A).

Accordingly, since the sheet 103 is kept in tight contact with the window glass 11 while being prevented from moving in the horizontal direction, the sheet-affixed window glass 100 looks as if the window glass 11 itself were colored or decorated or were processed to have the light-blocking ability, when seen outside. The sheet 103 is not moved in the vertical direction because of its own weight.

Next is a ninth embodiment of the invention.

Figure 16:
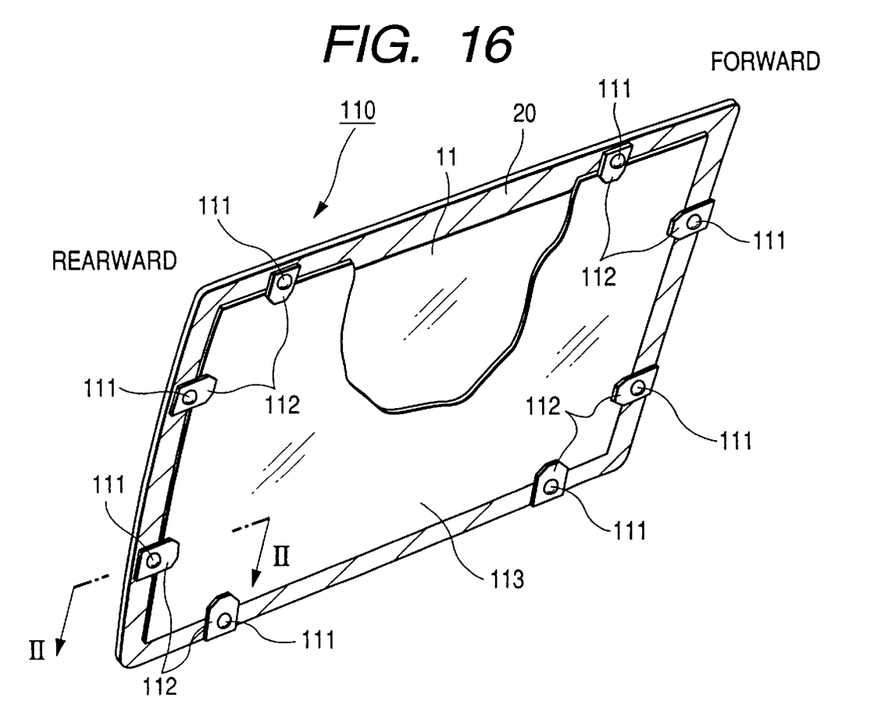
FIG. 16 is a perspective view of the sheet-affixed window glass according to a ninth embodiment of the invention.

FIG. 16 is a perspective view of the sheet-affixed window glass 110 according the ninth embodiment of the invention, which is seen from the room side of the van 1. In FIG. 16, the same members as those in the first embodiment are referred to by the same reference numerals and their description is omitted.

As shown in FIG. 16, the sheet-affixed window glass 110 is characterized in that the glass window 11 is provided with rotatable hooking members 112, . . . which are holders, via pins 111, . . . at the front and back sides and the upper and lower sides.

In this, the sheet 113 is sandwiched between the window glass 11 and the hooking members 112, . . . .

Figure 17A:
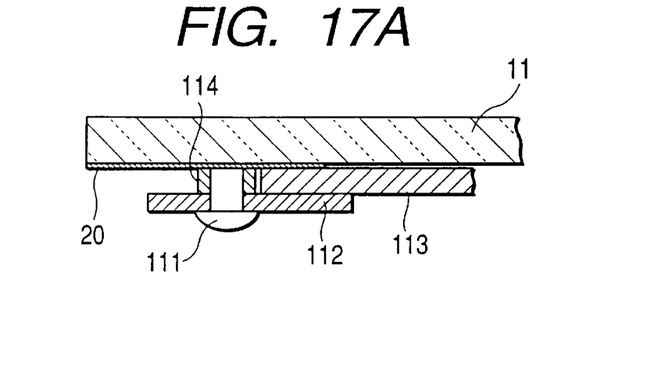
FIG. 17 is a cross-sectional view illustrating the attachment of hooking members for use in the ninth embodiment of the invention.
Figure 17B:
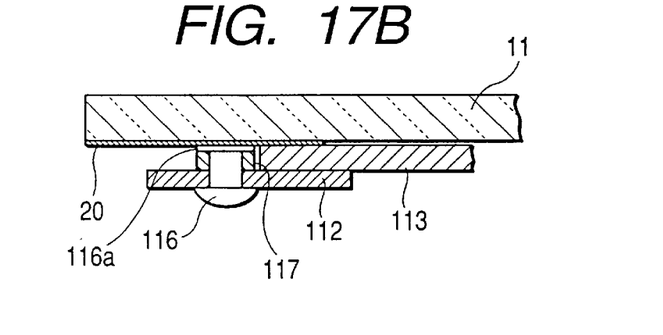

FIGS. 17A and 17B are cross-sectional views illustrating the attachment of the sheet 113 to the window glass 11 via the hooking members. Precisely, FIG. 17A is a cross-sectional view of FIG. 16 taken along the line II—II. FIG. 14B is a cross-sectional view illustrating a modification of the embodiment of FIG. 17A.

As shown in FIG. 17A, the pin 111 is fixed onto the surface of the film 20 of the window glass 11 with being provided with the hooking member 112 that is rotatable therearound via a spacer 114 disposed between the hooking member 112 and the window glass 11. In this, the sheet 113 is pressed against the window glass 11 by means of the hooking member 112.

In the modification in FIG. 17B, the base edge of the pin 116 is integrated with an adhesive member 116a, and this adhesive member 116a is adhered onto the surface of the film 20 of the window glass 11. In this modification, the pin 116 is more surely affixed to the window glass 11. In this, 117 is a spacer.

The functions of the sheet-affixed window glass according to the ninth embodiment of the invention are mentioned below.

Figure 18:
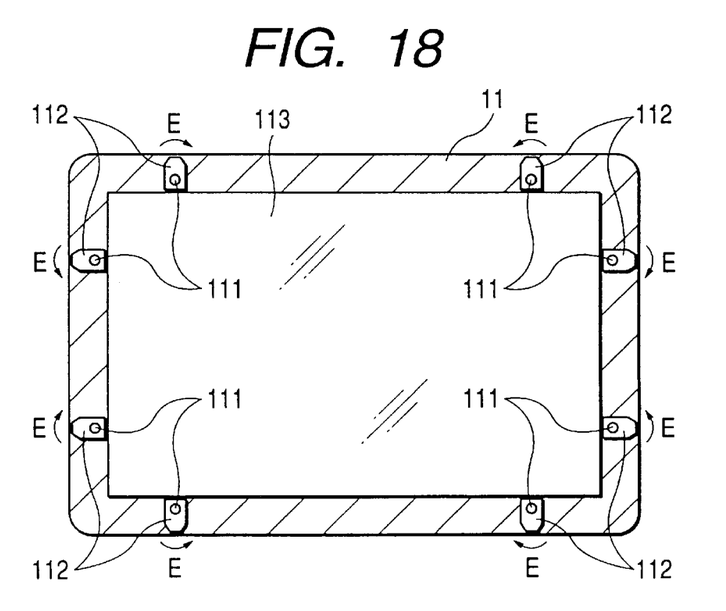
FIG. 18 is an explanatory view illustrating the mechanism of the sheet-affixed window glass according to the ninth embodiment.

FIG. 18 is an explanatory view to illustrate the mechanism of the sheet-affixed window glass of the ninth embodiment.

As shown in FIG. 18, the sheet 113 is overlaid on the inner surface of the window glass 11. Next, the hooking members 112, . . . are rotated around the pins 111, . . . in the direction of the arrow E.

Then, as shown in FIG. 16, the sheet 113 is airtightly affixed onto the inner surface of the window glass 11. Accordingly, the sheet-affixed window glass 110 looks as if the window glass 11 itself were colored or decorated or were processed to have the light-blocking ability, when seen outside.

In the first to ninth embodiments mentioned hereinabove, the light-shielding sheet 18 is affixed onto the side door window glass 11. Apart from those embodiments, for example, the sheet of any of the following [1] to [5] may be affixed onto the window glass 11.

[1] A sheet with letters and figures written on its surface is affixed onto window glass to produce decorative and advertising effects. The sheet for this purpose may be either transparent or opaque.

[2] An UV-cutoff sheet is affixed onto window glass to prevent crew members, passengers, drivers and also fellow passengers from being sun-burned and to prevent interior decorations from being yellowed.

[3] A heat-reflecting sheet is affixed onto window glass to control the temperature in rooms, to reduce the intensity of sunlight penetrating into rooms, and to reduce the load of air conditioners.

[4] A sheet with an anti-frosting film attached thereto is affixed onto window glass to prevent the glass from being frosted.

[5] An opaque sheet is affixed onto window glass to keep the inside of vehicles from being seen outside, for antitheft purposes.

Any of those sheets [1] to [5] may be affixed onto glass window to thereby change the room atmosphere in accordance with the feeling of crew members, passengers, drivers and also fellow passengers. Using the sheet-affixed window glass of the invention, for example, it is possible to cut off sun light penetrating into cars which are left for many hours in car parks in bathing resorts, thereby preventing the temperature in car rooms from being elevated, and it is also possible to ensure the privacy in cars.

Apart from the attachment structure of the sheets according to the aforementioned embodiments, for example, only the periphery of the sheet may be affixed to window glass, or the sheet may be machined to have holes through which the sheet is affixed to window glass via hooks or buttons.

In the aforementioned embodiments, the sheet is affixed to the inner surface of the window glass as curved outward the van in its side view. Apart from this, for example, the sheet may also be affixed to the inner surface of window glass as expanded outward to be spherical.

In the first embodiment, the sheet 18 is affixed to the window glass 11 at the front and back edges of the sheet 18 via the front and back holders 13 and 15. In addition to those front and back holders, for example, upper and lower holders may be additionally provided on the upper and lower edges of the window glass 11, and the four edges of the sheet 18 may be held by those front and back and upper and lower holders.

As having the constitution mentioned hereinabove, the invention exhibits various effects such as those mentioned below.

A transparent or opaque sheet is affixed onto window glass via holders for coloration, light blockage, decoration and the like. In this, therefore, the sheet can be easily attached to and detached from window glass Accordingly, the once-affixed sheet can be easily exchanged for a new one. Users can easily exchange the once-affixed sheet for a new one to thereby change the color, the light-blocking ability and the decorativeness of car window panes.

Further, the window glass may be provided with a film at a site at which holders are fitted to the window glass, and the film masks the holders. In this, therefore, the holders are kept from being seen through the outer surface of the window glass, and, in addition, the adhesive used for fitting the holders to the window glass is protected from being aged.

Furthermore, the sheet is tightly adhered onto window glass via holders. In this, therefore, when seen outside, the sheet-affixed window glass looks as if the glass itself were colored or decorated or were processed to have the light-blocking ability.

Still further, hooks are fitted to the inner surface of window glass via which the sheet is held to be airtightly adhered onto the inner surface of the window glass. In this, therefore, the holder mechanism for the sheet is simple.

What is claimed is:

1. A sheet-affixed window glass for a vehicle, comprising:
   a window glass of the vehicle;
   a sheet to be attached on an inner surface of the window glass;
   a holder attached to the inner surface of the window glass, said holder receiving an edge of and detachably holding said sheet along the inner surface of said window glass; and
   a film coating between the holder and the inner surface of said window glass, said film coating preventing said holder from being seen through said window glass.

2. The sheet-affixed window glass for a vehicle according to claim 1, wherein said sheet is transparent.

3. The sheet-affixed window glass for a vehicle according to claim 1, wherein said sheet is opaque.

4. The sheet-affixed window glass for a vehicle according to claim 1, wherein said sheet comprises synthetic resin.

5. The sheet-affixed window glass for a vehicle according to claim 1, wherein said sheet is in contact with said window glass.

6. The sheet-affixed window glass for a vehicle according to claim 1, wherein said holder comprises a member having a substantially U-shaped cross section, said member having a groove that is substantially parallel to said window glass to receive an edge of said sheet.

7. The sheet-affixed window glass for a vehicle according to claim 1, wherein said holder comprises a member having a substantially L-shaped cross section attached to said window glass by an adhesive, said L-shaped cross section comprising a base portion attached to said adhesive, and an extended portion substantially parallel to said window glass and pointing towards a center of said sheet to form a groove positioned between said window glass and said extended portion that receives an edge of said sheet positioned between said window glass and said extended portion.

8. The sheet-affixed window glass for a vehicle according to claim 1, wherein said holder comprises a plurality of rotatable hooking members attached to said window glass, each said rotatable hooking member receiving an edge of and detachably holding said sheet along the inner surface of said window glass.

9. A sheet-affixed window glass for a vehicle, comprising:
a window glass of the vehicle;
a sheet attached on an inner surface of said window glass, said sheet having a plurality of hooking grooves, wherein said hooking grooves are comprised of a substantially horizontal cut and a substantially vertical cut about a common point; and
a plurality of hooks attached to the inner surface of said window glass at a proximate end thereof, each of said plurality of hooks further having an outwardly extending portion and a distal portion, said distal portion having a diameter greater than a diameter of the outwardly extending portion, each of said plurality of hooks receiving said hooking grooves wherein said sheet is detachably held to the inner surface of said window glass by said hooking grooves received by said plurality of hooks.

10. The sheet-affixed window glass for a vehicle according to claim 9, wherein said sheet is transparent.

11. The sheet-affixed window glass for a vehicle according to claim 9, wherein said sheet is opaque.

12. The sheet-affixed window glass for a vehicle according to claim 9, wherein said sheet comprises synthetic resin.

13. A sheet-affixed window glass according to claim 1, wherein said film has a roughened surface.

14. A sheet-affixed window glass according to claim 9, further comprising a film coating between said plurality of hooks and the inner surface of said window glass, said film coating preventing said plurality of hooks from being seen through said window glass.

15. A sheet-affixed window glass for a vehicle, comprising:
a window glass fitted into a mole in a side door of the vehicle; and
a sheet to be attached on an inner surface of the window glass, wherein an edge of the sheet is received and detachably held in a groove of the mole.

16. A sheet-affixed window glass for a vehicle according to claim 9, wherein said horizontal cut is positioned at a perimeter of a first and a second side surface and a bottom side of said sheet.

17. A sheet-affixed window glass for a vehicle, comprising:
a window glass of the vehicle;
a sheet to be attached on an inner surface of the window glass; and
a holder having a substantially L-shaped cross section attached to the inner surface of the window glass, said L-shaped cross section comprising a base portion attached to said window glass, and an extended portion substantially parallel to said window glass and pointing towards a center of said sheet to form a groove positioned between said window glass and said extended portion that receives an edge of said sheet.

18. The sheet-affixed window glass for a vehicle according to claim 9, wherein said groove is positioned vertically with respect to said window glass.

* * * * *